United States Patent [19]

Dore

[11] 4,437,219

[45] Mar. 20, 1984

[54] APPARATUS FOR RETAINING AND INSTALLING AN INTERIOR ASSEMBLY OF A UNIVERSAL JOINT

[75] Inventor: Jacques Dore, Colombes, France

[73] Assignees: Societe Anonyme Automobiles Citroen; Societe Anonyme Automobiles Peugeot, both of Paris, France

[21] Appl. No.: 218,308

[22] Filed: Dec. 19, 1980

[30] Foreign Application Priority Data

Dec. 20, 1979 [FR] France .................. 79 31323

[51] Int. Cl.³ .................................... B23Q 1/00
[52] U.S. Cl. .................. 29/283; 269/254 R; 269/287
[58] Field of Search .......... 29/280, 282, 283, 148.4 C; 206/318, 303; 24/259 R, 258 R; 269/254 R, 287

[56] References Cited

U.S. PATENT DOCUMENTS

| | | | |
|---|---|---|---|
| 2,312,615 | 3/1943 | Allen | 206/318 |
| 2,433,172 | 12/1947 | Tipton | 269/287 |
| 3,568,282 | 3/1971 | Sawagata | 269/254 R |
| 3,645,258 | 7/1953 | Blakeley | 206/318 |
| 3,696,490 | 10/1972 | Secunda | 269/254 R |
| 4,175,728 | 11/1979 | Ferguson | 269/254 R |
| 4,193,588 | 3/1980 | Doneaux | 269/287 |
| 4,361,935 | 12/1982 | Paxton | 24/255 R |

*Primary Examiner*—Robert C. Watson
*Attorney, Agent, or Firm*—Brisebois & Kruger

[57] ABSTRACT

A retainer for the parts of the interior assembly of sliding automotive universal joints, for example, of the tripod type constituted, of a splined hub with trunnions which support rollers with interposed bearing means, such as needle bearings. The retainer (1) is a flat slitted ring (2) made of a slightly elastically deformable material and has regularly spaced open seats (L) for receiving rollers (12), and holder (6,7) to retain the rollers (12) and needle bearings (13) in position on the trunnions (11) of the interior assembly of the universal joint.

5 Claims, 5 Drawing Figures

APPARATUS FOR RETAINING AND INSTALLING AN INTERIOR ASSEMBLY OF A UNIVERSAL JOINT

BACKGROUND OF THE INVENTION

The invention relates to a retainer for sliding universal joints, for example of the tripod type, especially for automobile transmissions, which have an interior element coupled to a drive shaft and composed of a hub with at least two trunnions supporting rollers which seat in roller tracks of a bowl shaped exterior element fixed to a driving shaft and in which bearing means, such as needle or roller bearings are provided between the rollers and the trunnions.

The interior assembly of such joints is difficult to handle and is particularly difficult to transport as an assembly. In effect, it is difficult to transport this interior assembly as a single unit composed of the hub and its trunnions (usually three), with the rollers on the trunnions. This difficulty arises because the needle bearings between the rollers and the trunnions can fall out or escape very easily during manipulation and mounting of this assembly on the drive shaft or in the exterior bowl element of the joint.

Various solutions to this problem have already been suggested, but they are not entirely satisfactory, because they require special machining of the tripod or spider.

SUMMARY OF THE INVENTION

The invention has as its object to provide a reusable retainer having improved practical features while being particularly economical since they do not require any supplementary machining of the joint parts.

According to the invention, there is provided a retainer for sliding universal joints, of the type described above, characterized in that it is constituted of a flat ring of a material which is slightly elastically deformable, has regularly spaced open seats for the rollers, and is provided with holding means which after mounting, retain the rollers and needle bearings supported by the trunnions.

According to one preferred embodiment of the invention, the above-mentioned seats take the form of indentations or recesses bordering a central opening of the above-mentioned flat ring, and are further defined by two small symmetrical tongues projecting respectively from either side of the flat ring, and having a concave internal surface, preferably spherical, and whose ends which are spaced from the flat ring define openings of sufficiently small size to insure the retention of the rollers in the seats while allowing their mounting in the seats by slight deformation of the small tongues.

The retainer advantageously has a radial slit. The edges of the flat ring which define the above-mentioned radial slit are supplied with locking means which may be made of complementary cylindrical shapes, able to fit into each other.

The retainer is advantageously made of a molded plastic material, for example of polypropylene.

The invention comprises, in addition to the arrangements described above, certain other arrangements which will be more explicitly described hereinafter with reference to a particular embodiment, but which is in no way limiting.

Figure 1:
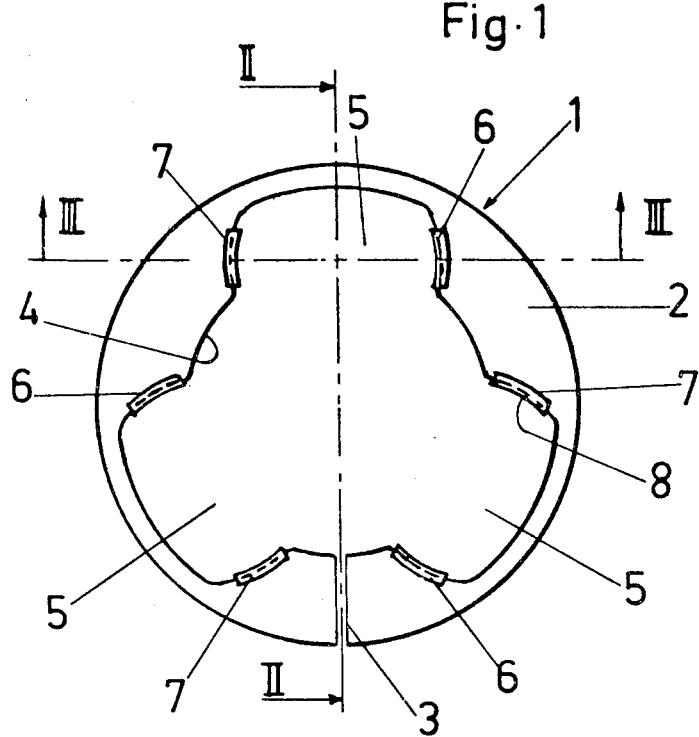
FIG. 1 is a view in elevation of the retainer of the invention.
Figure 2:
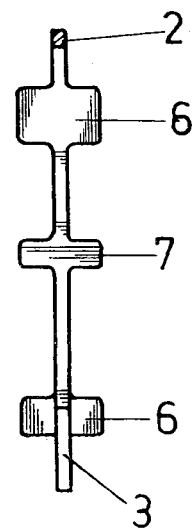
FIG. 2 is a sectional view taken along the line II—II of FIG. 1.
Figure 3:
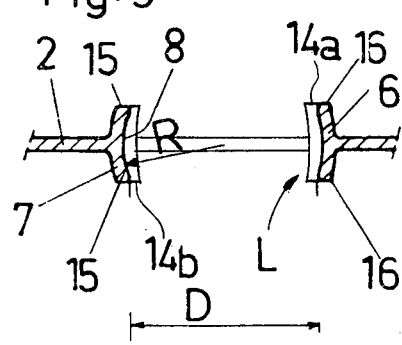
FIG. 3 is a partial sectional view taken along the line III—III of FIG. 1.

Referring to the drawings and particularly to FIGS. 1 to 3, one can see a retainer 1 for use with a sliding universal joint of the tripod or three trunnion type. Retainer 1 takes the form of a flat ring 2 of a slightly elastically deformable material and has a radial slit 3. Its central opening 4 is bordered by three large inwardly facing generally U shaped recesses or indentations 5 regularly spaced circumferentially. Each of these indentations is bounded by two small symmetrical tongues or tabs 6 and 7, projecting respectively beyond both sides of the flat ring 2, and having a concave internal surface, preferably spherical, so as to provide a seat L of radius R.

The retainer is advantageously made of a molded plastic material, for example, polypropylene.

Figure 4:
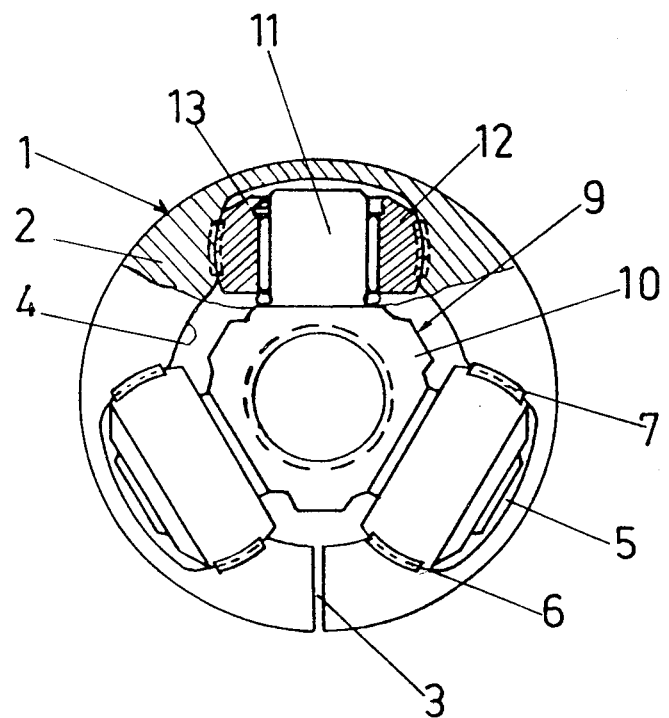
FIG. 4 is an elevational view in partial section showing a retainer according to the invention mounted on a three trunnion hub equipped with rollers and needle bearings.

FIG. 4 shows the retainer 1 fitted onto the interior assembly of a tripod 9 composed of a splined hub 10 with three trunnions 11 regularly spaced circumferentially and on which are mounted rollers 12 with interposed rolling means, such as needle bearings 13. Each roller 12 is essentially free to move axially on the trunnion on which it is mounted.

The rollers 12 have the shape of a segment of a sphere of radius approximately equal to the radius R of the seats L formed by the small tongues 6 and 7. The rims or edges 15 and 16 of the small tongues 6 and 7 which are spaced from the flat ring 2 have open ends 14a, 14b spaced apart by a distance D sufficiently small to assure the retention of the rollers 12 inside the seats L while allowing insertion of the rollers by slight deformation of the ends of small tongues 6 and 7.

For mounting the retainer 1 on the tripod 9 on which rollers 12 and needle bearings 13 have been placed to form the inner assembly it is sufficient to hold the retainer beside the assembly, with the rollers 12 placed against the open ends 14a or 14b of the seats L formed by the small tongues 6 and 7. One then applies relative axial pressure between the retainer and the tripod causing a slight deformation of the tongues 6 and 7 so that the rollers 12 enter the space defined by the seats L and the small tongues 6 and 7 then close on the rollers 12 in a manner to hold them. The three rollers 12 together with the needle bearings are then maintained in position on the tripod 9, to form a compact assembled unit.

The handling and insertion of this ensemble is relatively easy. It is easy, without special precautions, to mount the interior element on the drive shaft and then in the interior grooves of the exterior element of the driving shaft. At the time of presentation of the exterior element, the edges of the races therein for the roller 12 engage the rims or edges 15 and 16 of the small tongues 6 and 7 and displace the retainer 1 axially an amount sufficient to cause the races or roller tracks to receive the rollers 12. In the course of this movement, the axial force exerted by the exterior element on the rims 15 and 16 of the small tongues 6 and 7 causes a deformation of these latter and therefore permits the retainer 1 to release itself from the interior element 9. The retainer 1 then is positioned around the drive shaft which is usually provided at its other end with another drive joint. The radial slit 3 then permits, by elastically spreading the flat ring 2, the removal of the retainer 1 from the drive shaft without damage.

Figure 5:
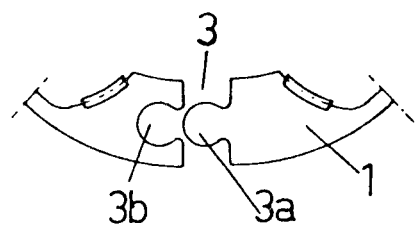
FIG. 5 is a partial view of a detail of a variation of the invention.

It can be advantageous to increase the rigidity of the retainer 1, when engaged with the inner assembly 9, but while retaining the ease of its removal from the drive shaft, by providing the edges of the radial slit 3 with complementary interlockable shapes. One such embodiment of the invention is shown on FIG. 5 in which one of the edges has a cylindrical male projection 3a while the other edge has a cylindrical female recess 3b.

When parts 3a and 3b are interengaged by axially flexing the ring retainer acts then as a closed ring, at the same time retaining the capability to be opened by withdrawing projection 3a axially for removal of the ring from a shaft, by spreading the ring without damage.

The retainer of the invention, when used, avoids the need for difficult to install roller retaining snap rings and expensive to form machined grooves, which can sometimes interfere with free operation of the assembled universal joint.

I claim:

1. A retainer for the interior assembly of sliding universal joints of the type which includes an interior element constituted of a hub having at least two trunnions, a roller in the form of a spherical segment mounted on each trunnion, a substantially flat ring having sides, and of slightly elastically deformable material, said ring having a central opening and at least two inwardly opening recesses bordering said central opening and defined by the material of the ring, said central opening and recesses comprising a space to receive the assembled interior universal joint assembly within the ring, and seat means in each recess for engaging said rollers and maintaining said rollers in an assembled position on the trunnions, said seat means in each recess comprising, a pair of generally symmetrical elastically deformable spaced apart tongues connected to the material of the ring in the recess, each tongue having a concave interior surface, said concave surfaces facing toward each other to receive and engage a roller therebetween, said tongues projecting axially of the ring beyond the sides of the ring and terminating at ends spaced apart a distance slightly less than a diameter of the spherical segment of a roller so that the assembled interior assembly of the universal joint can be mounted in the retainer and can be removed from the retainer by moving the retainer axially relative to the assembled interior assembly of the universal joint.

2. A retainer according to claim 1, wherein said concave surface of each tongue comprises a concave spherical surface.

3. A retainer according to claim 1, wherein one side of said ring has a radial slit to facilitate expanding the ring.

4. A retainer according to claim 3, further comprising interengaging means on said ring for connecting together the ends of the ring at said slit.

5. A retainer according to any one of claims 2 to 4 or 1 wherein said seats and ring comprise an integrally molded one piece unit.

* * * * *